P. H. Niles,
Gage Lathe.

N° 16,705.   Patented Feb. 24, 1857.

UNITED STATES PATENT OFFICE.

PETER H. NILES, OF BOSTON, MASSACHUSETTS, ASSIGNOR TO HIMSELF, N. HUNT, R. C. WEBSTER, AND A. DOUGLAS, JR.

DEVICE TO OPERATE THE MANDREL-CUTTERS IN TURNING TAPERING STICKS.

Specification of Letters Patent No. 16,705, dated February 24, 1857.

*To all whom it may concern:*

Be it known that I, PETER H. NILES, of Boston, in the county of Suffolk and State of Massachusetts, have invented a new and useful Machine for the Turning of Wood to any Curvilinear, Straight, or Tapering Pattern, of which the following is a full and exact description.

The invention consists, first, of a hollow arbor, which is capable of being revolved in suitable bearings, to one end of which a chuck is attached which carries a cutter, and also three movable radial jaws, whose office is to steady the work; secondly, of a cam which moves the jaws toward and from the axis of the arbor while the work is passing through the said arbor; thirdly, of a chain or belt, provided with projections or dogs for carrying the work to the cutter.

Figure 4:
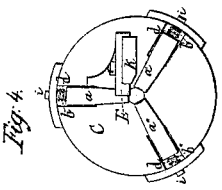
Figure 1:
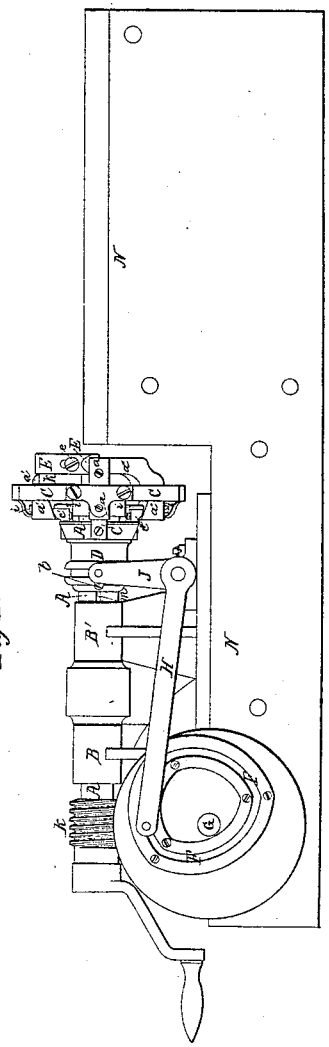
Figure 2:
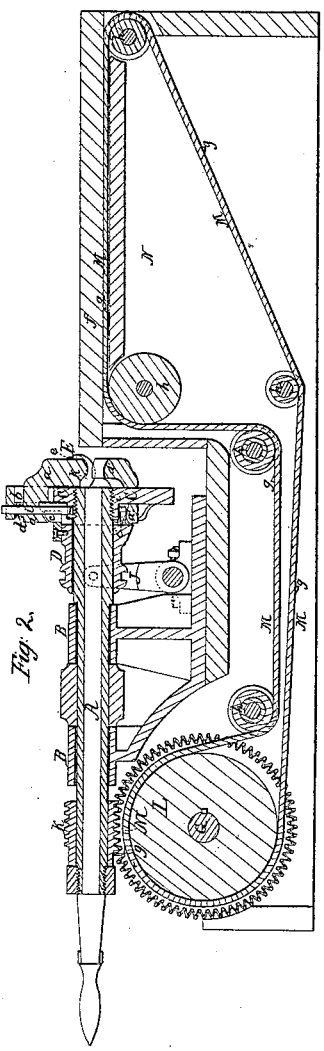
Figure 3:
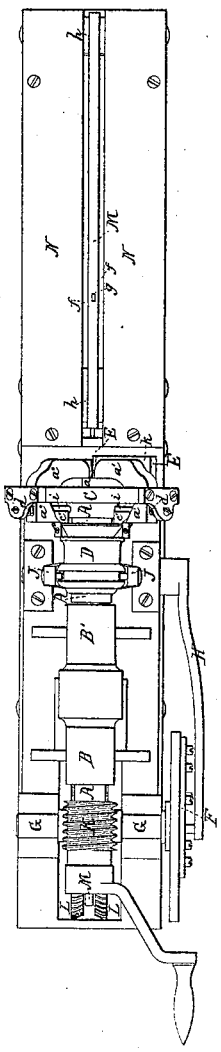

To enable others to make and use my invention, I will describe its construction and operation by reference to the accompanying drawings, which make a part of this specification, and in which, Figure 1, is a longitudinal elevation. Fig. 2, is a longitudinal section. Fig. 3, is a plan. Fig. 4, is a front elevation of the chuck.

Similar letters refer to similar parts in each of the figures.

A is a hollow arbor, which is supported in bearings B, B', and to one end of which a face plate C, is attached. This face plate supports and guides three radial jaws $a$, $a'$, $a''$ (Fig. 4) which are capable of being moved equally and simultaneously in slots, $b$, $b'$, $b''$, from the axis of the arbor by means of three equally inclined planes, $c$, $c'$, $c''$ (Figs. 1, 2 and 3) which are attached to a movable tube D; and toward the axis of the arbor by springs $d$, $d'$, $d''$, which encircle the guide rods $i$, $i'$, $i''$. In practice the inclines are double, and the springs are dispensed with. A cutter, E, is attached to one of the movable jaws, $a$, and is adjusted to the work and fastened to its bed, K, by a bolt, $e$. This cutter—upon the position of which the accuracy of the work depends—is a portion of a cylinder; and its supporting bed K, is so attached to the jaw, that, while the cutting edge at the extremity of the cylinder lies in a longitudinal plane which may be conceived to pass radially through the center of the jaw, its face or convex surface is tangent to the helical path which is formed by the cutting edge when revolved about the axis of the arbor.

That portion of the curved bearing surface of each of the three jaws, which—as seen in Figs. 2 and 4—is nearest the axis of the arbor, is in the same plane of revolution, and at the same distance from the axis of the arbor as the corresponding part of the curvilinear cutting edge; while the remaining part of the surface is so formed, that it shall be in as close contact with the work as possible, to prevent any trembling of the work. The tube D, to which the inclines $c$, $c'$, $c''$ are attached, is movable in a longitudinal direction upon the arbor toward and from the face plate, said movement being derived from a cam F, which is fast upon a shaft G; the motion of said cam being transferred to the movable tube by a system of levers H and J. The revolution of the tube with the arbor is compelled by the pin $l$, attached to the tube, and guided in the groove $m$ of the arbor. The shaft G, is revolved by a worm K, on the arbor, which drives the worm wheel L, attached to shaft G.

The material to be reduced is brought to the cutter by projections or dogs, $g$, &c., on an endless belt M, which is movable in a groove $f$, in the bed N, and is driven by the worm wheel L; the guide pulleys $h$, $h$, &c., of the belt will be easily understood from the drawings.

In practice an endless chain, driven by a rag wheel, is preferable to the simple belt here shown. The circumference of the wheel L, at the part around which the belt passes, must be equal to the distance between the dogs $g$, $g$, &c. The stock to be wrought having been cut to the required length—which is governed by the distance between the projections or dogs on the feeding belt, the action of the machine is as follows: The stock is laid in the groove $f$, of the bed N, and the dogs $g$, on the belt being by the revolution of the worm wheel L, brought in contact therewith, the stock is moved steadily forward to the cutter, E, by the revolution of which, and its movements toward and from the axis of the arbor, the pattern of the cam F, is transferred to the work, which being carried forward toward the other end of the hollow arbor by the pressure of the dog, is removed by the attendant as soon as the succeeding piece of stock has pushed it clear of the cutter. The axis of the work while being acted upon by the cutter, is made to coincide with the axis of the arbor by the equal and simultaneous movement of the three radial jaws.

I do not claim a chuck with movable jaws as any novelty; but

What I claim as my invention and desire to secure by Letters Patent is—

The method herein described of operating the cutters of a revolving cutter head viz by means of the springs $d\ d'$ inclined planes $c\ c'$ and the sleeve D, operated by a cam F in the manner as set forth.

In witness whereof I have hereunto subscribed my name this twenty-eighth day of August eighteen hundred and fifty-six.

PETER H. NILES. [L. S.]

In presence of—
S. D. SLOCUM,
N. GALE.